Sept. 13, 1949.  L. HEIDMANN  2,481,743
CONTROLLER AND CIRCUIT BREAKER FOR ELECTRIC MOTORS
Filed July 28, 1947
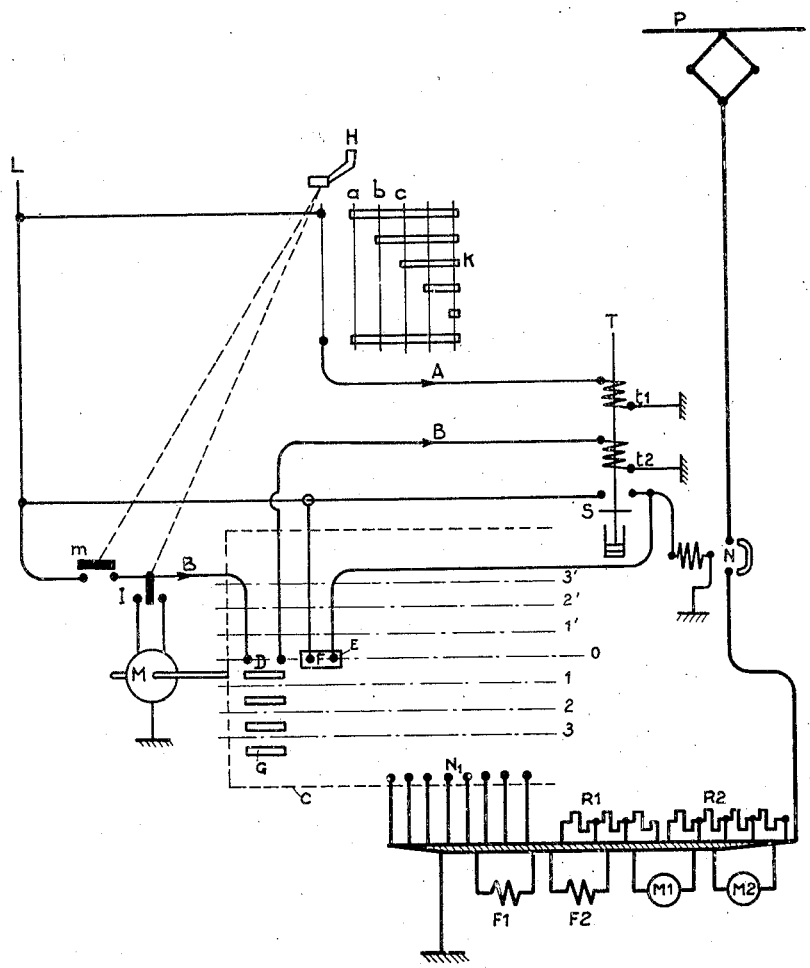
Inventor
L. Heidmann
By
C. F. Wenderoth
Attorney Patented Sept. 13, 1949

2,481,743

UNITED STATES PATENT OFFICE 2,481,743

CONTROLLER AND CIRCUIT BREAKER FOR ELECTRIC MOTORS

Leon Heidmann, Jeumont, France, assignor to Societe Anonyme dite: Forges et Ateliers de Constructions Electriques de Jeumont, Paris, France, a corporation of France Application July 28, 1947, Serial No. 764,112
In France September 29, 1942

5 Claims. (Cl. 318—545)

This invention relates to means for automatically interrupting the circuits of electric motors, particularly of traction motors, when there is an accidental stoppage or irregularity in the return movement of the main cam shaft controller associated with said electric motors.

It is usual to start electric motors by contacts operated in a desired order by a cam shaft controller and to interrupt the circuit of these motors when the cam shaft returns to the initial position. If in such an arrangement, which is particularly used in electrical traction, the cam shaft stops accidentally during its return movement, the motors will still receive current and this may be dangerous. In order to avoid such an accident it is known to use a circuit breaker for interrupting the current at the beginning of the movement of the cam shaft.

The present invention has for an object an improved arrangement which assures automatically the interruption of the current in case there is an untimely stop or an irregularity in the return movement of the cam shaft controller.

Other objects and advantages of the invention will become apparent from the detailed description below and shown in the accompanying drawing, in which the attached simplified diagram represents an embodiment of the invention.

The invention consists substantially in maintaining the circuit breaker in its closed position by an auxiliary current controlled by a delayed action relay of the slow opening type. This delayed action relay is itself excited in two ways:

1. By a current A which is closed by the control elements as soon as the running operation of the main motors is to be obtained and which is interrupted when the stopping of these motors is to be effected.

2. By an intermittent current B which is intermittently closed by the cam shaft controller each time that it passes from one position to the following.

If the cam shaft controller is operated by an electrical pilot-motor this intermittent current can be a fraction of the current operating said pilot-motor. The time delay of the delayed action relay is more than the time necessary for the cam shaft controller to pass normally from one position to the following.

The attached drawing representing an embodiment of the invention, shows the main motors $M_1$ and $M_2$ having field windings $F_1$ and $F_2$ cooperating with resistors $R_1$ and $R_2$ and receiving their current from the line P through a circuit breaker N. The different couplings as well as the starting, running and braking connections are effected by a main cam shaft controller C driven by a reversible pilot-motor M and connected to the main motors $M_1M_2$ through its terminals $N_1$.

The pilot-motor M is started in a desired direction by a switch $m$ closing the control current delivered by the control feeder L, and by a reverse switch I.

The elements $m$ and I can be both mechanically connected to the handle H of a master controller K, so that $m$ is closed when the handle is out of its zero position, and that I closes one of its two circuits according to the direction of the rotation of H. When the master controller K reaches the position $a$, $b$, $c$, etc.; the main camshaft controller C is operated by M to reach the corresponding traction positions 1, 2, 3, etc. If the master controller reaches opposite positions $a'$, $b'$, $c'$, etc. (not shown), the main controller C is operated by M to reach the braking positions $1'$, $2'$, $3'$, etc.

When the pilot motor M is receiving current from L, the switch $m$ being closed, a part of this current, as shown by the arrows B, can pass from time to time through the fixed fingers D, when they are closed by the movable segments G of the cam shaft controller C.

Those segments G are located between the running positions 0, 1, 2, 3 . . . An intermittent current B is in this way periodically delivered to the exciting coil $t_2$ of a delayed action slow opening relay T, which is thus maintained in its upper position. In this position, the relay T closes by its contacts S the operating circuit of the main circuit breaker N.

Another coil $t_1$ upon the same relay T is excited by a permanent current A which is closed by the master controller K, as long as the latter is in the positions $a$, $b$, $c$, etc. corresponding to the running operation of the main motors $M_1M_2$.

The cam shaft controller C can also comprise two additional fingers F which are short-circuited in the zero position of C by a segment E, so that in this zero position the coil of the main circuit breaker N is permanently excited and the breaker is maintained in the closed position. The described equipment operates as follows:

When the running operation of the motors is desired the contacts S of the relay T are permanently closed by the current A and the circuit breaker N remains closed.

When the stopping of the motors is to be obtained the current A is interrupted by K but at the same time the pilot-motor M and the cam controller C are effecting the return movement to the initial position. The current B is thus periodically delivered to the coil $t_2$ and because of its time delay the relay T still remains closed.

If the cam shaft is too slow, or if its movement stops at an intermediate position, or if there is a failure of the current to the pilot-motor, the current B is definitely interrupted and the relay T opens the contacts S producing the tripping of the circuit breaker N.

The safety of this equipment is particularly satisfactory if a mechanical jamming or stopping of the cam shaft controller during the return movement brings about by an appropriate device the interruption of the pilot-motor circuit.

The description above is only given by way of example and the invention may be applied in the same way in the cases of a plurality of circuit breakers, a plurality of cam-shaft controllers and whatever may be the mode of operation.

I claim:

1. A safety equipment for interrupting the current of electric motors when there is a stoppage or an irregularity in the return movement of a cam shaft controller cooperating with said motors, comprising a master controller, a main circuit breaker, a first auxiliary circuit normally maintaining said circuit breaker closed, a delayed action slow opening relay with two coils adapted to close said circuit breaker, the first of said coils being connected in series with said first auxiliary circuit to maintain said relay in a closed position, a second auxiliary circuit comprising the second of said relay coils, means upon said master controller for energizing said first auxiliary circuit during the running of said motors only, and means upon said cam shaft controller for periodically closing said second auxiliary circuit during the return movement of said cam shaft controller, when the first coil is deenergized.

2. A safety equipment for automatically interrupting the current of electric motors cooperating with a master controller and with a main controller of the cam shaft type, if the return movement of said main controller is defective or irregular, comprising a main circuit breaker, a delayed action slow opening relay with two coils and with contacts adapted to close said circuit breaker, a first coil control circuit normally maintaining said relay in its closed position during the starting and running operation only, and a second coil control circuit adapted to be intermittently closed by the return movement of said main controller, when the first coil control circuit is deenergized.

3. A safety equipment for operating a main circuit breaker protecting electric motors associated with at least one master controller and with at least one main controller of the cam shaft type driven by a reversible pilot-motor, said equipment comprising means for starting and reversing said pilot-motor, said means being mechanically connected to said master controller, a slow opening delayed action relay closing the operating circuit of said main circuit breaker, two coils upon said relay, the first coil being adapted to be excited when said master controller is in a traction position only, the second coil being adapted to receive intermittent current impulses when said master controller is brought back to its zero position deenergizing said first coil, and said main controller is returning from its traction positions to its zero position, and means for producing said current impulses, comprising fixed fingers and movable segments fixed between the traction positions of said main controller.

4. In an electrical equipment comprising main motors, at least one main controller of the camshaft type, a pilot-motor operating said main controller, at least one master controller and at least one circuit breaker, safety means comprising a slow opening delayed action relay, a first coil upon said relay arranged to be excited when said master controller is in its traction positions only, a second coil upon said relay adapted to maintain said relay in the closed position when receiving intermittent current impulses, contacts upon said relay adapted to close the said circuit breaker, a plurality of movable segments upon said main controller located between its traction positions, fixed fingers cooperating with said segments and adapted to complete intermittently the circuit of said second relay coil, and control elements for said pilot-motor consisting of an ordinary switch and of a reverse switch, both mechanically connected with said master controller.

5. Safety means according to claim 4, comprising an additional movable segment upon said main controller adapted to close said circuit breaker when said main controller is in the zero position.

LEON HEIDMANN.

REFERENCES CITED

The following references are of record in the file of this patent:

UNITED STATES PATENTS

| Number | Name | Date |
|--------|------|------|
| 608,302 | Rice | Aug. 2, 1898 |
| 1,412,589 | Zweigbergk | Apr. 11, 1922 |
| 1,593,404 | Hastings | July 20, 1926 |
| 1,633,102 | Jackson | June 21, 1927 |